United States Patent
Busch et al.

(10) Patent No.: US 8,860,820 B2
(45) Date of Patent: Oct. 14, 2014

(54) VIDEO RECORDING SYSTEM, METHOD, AND COMPUTER PROGRAM FOR MEMORY SPACE DISTRIBUTION IN A VIDEO RECORDING SYSTEM

(75) Inventors: Hans-Juergen Busch, Buechenbach (DE); Rainer Bauereiss, Baiersdorf (DE); Thomas Huber, Nuremberg, DE (US); Dieter Joecker, Altdorf (DE)

(73) Assignee: Robert Bosch GmbH, Stuttgart (DE)

( * ) Notice: Subject to any disclaimer, the term of this patent is extended or adjusted under 35 U.S.C. 154(b) by 1932 days.

(21) Appl. No.: 11/736,669

(22) Filed: Apr. 18, 2007

(65) Prior Publication Data

US 2007/0250883 A1   Oct. 25, 2007

(30) Foreign Application Priority Data

Apr. 24, 2006  (DE) .......................... 10 2006 018 959

(51) Int. Cl.
*H04N 5/225* (2006.01)
*H04N 5/76* (2006.01)
*H04N 9/64* (2006.01)

(52) U.S. Cl.
USPC ...................... 348/207.1; 348/714; 348/231.3

(58) Field of Classification Search
USPC .................... 348/143, 231.3, 714–715, 207.1
See application file for complete search history.

(56) References Cited

U.S. PATENT DOCUMENTS

| 5,360,007 | A | 11/1994 | Shinomura et al. |
| 7,090,338 | B2 * | 8/2006 | Axtell et al. ..................... 347/57 |
| 8,219,639 | B2 * | 7/2012 | Soltis ............................. 709/217 |
| 2004/0105008 | A1 | 6/2004 | Yamazaki |
| 2005/0076176 | A1 * | 4/2005 | Takada et al. ................. 711/112 |
| 2005/0248622 | A1 * | 11/2005 | Axtell et al. .................... 347/57 |
| 2006/0171453 | A1 * | 8/2006 | Rohlfing et al. ......... 375/240.01 |
| 2006/0245731 | A1 * | 11/2006 | Lai .................................. 386/96 |
| 2007/0019077 | A1 * | 1/2007 | Park ........................ 348/211.99 |
| 2007/0140487 | A1 * | 6/2007 | Meier et al. .................... 380/201 |
| 2009/0240784 | A1 * | 9/2009 | Soltis ............................. 709/217 |
| 2010/0260157 | A1 * | 10/2010 | Buchholz et al. ............. 370/338 |

FOREIGN PATENT DOCUMENTS

GB      2 432 739      5/2007

* cited by examiner

*Primary Examiner* — Ebrahim Golabbakhsh
(74) *Attorney, Agent, or Firm* — Michael J. Striker (57) ABSTRACT

In the present digital age, the storage of data and the administration of the stored data is a problem area which, despite rapidly dropping prices for storage media, is increasingly important as technology becomes more sophisticated. In the field of security technology, for instance, storing streams of video data or compressed streams of video data that are recorded by surveillance cameras plays an important role. Some of the streams of video data stored should be stored for a defined length of time, such as a few days, while some data should be stored permanently, and there is accordingly a need for a highly flexible solution to the problem. A video recording system for recording video data, a method for memory space distribution in the video recording system, and a computer program for this purpose are proposed.

20 Claims, 6 Drawing Sheets

VIDEO RECORDING SYSTEM, METHOD, AND COMPUTER PROGRAM FOR MEMORY SPACE DISTRIBUTION IN A VIDEO RECORDING SYSTEM

CROSS-REFERENCE TO A RELATED APPLICATION

The invention described and claimed hereinbelow is also described in German Patent Application DE 102006018959.0 filed on Apr. 24, 2006. This German Patent Application, whose subject matter is incorporated here by reference, provides the basis for a claim of priority of invention under 35 U.S.C. 119(a)-(d).

BACKGROUND OF THE INVENTION

The invention relates to a video recording system for recording video data, to a method for memory space distribution in the video recording system, and to a computer program.

In the present digital age, the storage of data and the administration of the stored data is a problem area which, despite rapidly dropping prices for storage media, is increasingly important as technology becomes more sophisticated.

In the field of security technology, for instance, storing streams of video data or compressed streams of video data that are recorded by surveillance cameras plays an important role. Some of the streams of video data stored should be stored for a defined length of time, such as a few days, while some data should be stored permanently, and there is accordingly a need for a highly flexible solution to the problem.

In the field of security technology, two different principles for implementing data storage are typically employed:

First, the data are stored on local data media (such as hard disks), which are directly connected to the video camera. Second, memory networks are known that record and store the data streams originating in the surveillance cameras. In both of these typical principles, old data that are no longer needed are overwritten or erased.

For the application of video reproduction, U.S. Pat. No. 5,360,007 for instance discloses a client-server system, in which video programs, such as films, from a single central mass store are broken down into fragments under the control of an administration program, and the fragments are distributed to many individual memories in the form of magnetic disks; the individual memories are allocated to different data servers. If then the same video program is called up from the memory servers by many clients, then the clients must request the individual fragments from different memory servers in order to obtain the complete video program. In this way, the access load put on the various memory servers by the clients is distributed.

SUMMARY OF THE INVENTION

It is therefore an object of the present invention to provide a video recording system, method, and computer program for memory storage space distribution in a video recording system, in which to avoid the disadvantages of the prior art.

In keeping with these objects and with others which will become apparent hereinafter, one feature of the present invention resides, briefly stated, in a video recording system for recording video data in a memory network including interfaces for connecting memory servers to storage volumes and for connecting writing clients, the video recording system, comprising at least one writing client for furnishing the video data; an allocation device for the memory network, said allocation device being configured for administering a storage volume of the memory servers, in that said allocation device dynamically allocates statically divided memory blocks of the storage volume to said at least one writing client; and at least one surveillance camera which is configured for generating the video data and is hard-wired to said at least one writing client.

Another feature of the present invention resides, briefly stated, in a method for memory space distribution, comprising providing at least one writing client for furnishing the video data; administering by an allocation device for the memory network, administering a storage volume of the memory servers, in that said allocation device dynamically allocates statically divided memory blocks of the storage volume to said at least one writing client; and generating the video data by at least one surveillance camera, which is hard-wired to said at least one writing client, in which in an initialization step, the storage volume of the at least one memory server is subdividing by the allocation device into static memory blocks, and in an allocation step, the memory blocks are distributed dynamically to the writing clients by the allocation device, wherein during the running time of the memory network, added storage value is subdivided into additional static memory blocks.

A further feature of the present invention resides, briefly stated, in a computer program having program code means, for performing all the steps of the method of the invention, if the program is executed on a computer and/or on a video recording system of the invention.

The proposed video recording system, method for memory space distribution, and computer program are proposed have the same advantage of administering the available storage volume in a memory network optimally and/or in a failsafe way.

The video recording system of the invention is suitable and/or embodied for recording video data, in particular compressed and/or encoded video data, in a memory network; as the protocol in the memory network, TCP/IP is preferably employed. The memory network includes interfaces, in particular network nodes, for networked connection of a plurality of memory servers and a plurality of writing clients. Preferably, each memory server and/or each writing client is allocated an individual interface, or interface of its own, in the memory network.

An allocation device is embodied by software and/or hardware for administering the storage volume located on the memory servers. The storage volume is preferably implemented in the form of mass stores, in particular RAID drives, local hard disks of the memory servers and/or of the writing clients. In this last embodiment, the writing clients are simultaneously used as memory servers and thus perform a dual function.

It is provided that the allocation device is embodied by software and/or hardware for dynamic allocation of statically divided memory blocks to the writing clients. Preferably, the allocation device is furthermore embodied for statically dividing the storage volume into the static memory blocks.

The static division and the static memory blocks are preferably characterized in that this division of the memory servers is not changed, or not changed fundamentally, during the running time of the memory network. Conversely, dynamic allocation of the memory blocks to the writing clients refers to an event-controlled and/or memory-load-dependent allocation, particularly during the running time of the memory network. Preferably, the allocation device is embodied as a central network device for the entire memory network."

According to the invention, the video recording system includes at least one surveillance camera, which is embodied for generating the video data and is hard-wired to the at least one writing client.

The invention is based on the concept that previously known memory architectures, that is, local storage or storage via memory networks, is not optimal, especially for the field of video surveillance systems. Particularly when compressed streams of video data furnished by surveillance cameras are stored in memory, the data volume generated can be predicted in advance only poorly, since the data volume is dependent on the compression of the original video data, on the algorithms used, and on the changes over time in the picture data. In local storage of compressed streams of video data, which has been usual so far, the presumption is basically a worst-case scenario, so that redundant security memory space must be furnished, which is unnecessary and cost-intensive.

A disadvantage in using memory networks is typically that powerful memory servers are needed, which receive the data streams from the writing clients and administer and store them. The invention conversely proposes a video recording system in which the static memory blocks are allocated dynamically to the writing clients during the running time. After the allocation, the writing clients are preferably capable on their own, and in particular without the interposition of the allocation device, of writing the allocated memory blocks. This architecture assures first that a writing client is allocated only as much static memory as it actually and/or currently needs, and second, that to achieve the allocation device, an oversize server need not be provided, since the data to be stored are sent by the writing clients directly to the memory servers, and the allocation device takes on only the administration of the memory blocks.

In a preferred embodiment, the static memory blocks are embodied as reserved physical regions of the storage volume, and in particular of the respective storage medium. Because physical regions of a storage volume are allocated—instead of logical regions, as is otherwise usual—fragmentation of the storage volume is averted. Preferably, the static division is embodied as permanent formatting. The memory blocks preferably have a memory size of at least 10 megabytes, and in particular more than 100 megabytes, preferably more than 1 gigabyte. With this memory block size, it assured that a writing client need not constantly jump from one physical memory block to the next and in this way be unnecessarily burdened. On the other hand, by an optional limitation of the memory block size to less than 10 gigabytes, preferably less than 5 gigabytes, thrifty distribution of the storage volume is assured.

Because optionally all the memory blocks have the same memory size, especially simple administration of the storage volume by the allocation device is achieved. Alternatively, it may be provided that the memory blocks are divided up into only a few different, but standardized, memory sizes, for instance fewer than five different memory sizes. This last embodiment makes it possible for writing clients that are known to have a relatively large memory requirement, which can be ascertained for instance with knowledge of the camera properties, to be allocated memory blocks of a suitably adapted size.

The allocation device preferably includes an allocation module, which allocates the static memory blocks to a supply quantity for free memory blocks, or to one or more occupation quantities for used memory blocks. By means of the allocation module, an allocation table, from which on the one hand a list for free memory blocks and on the other one or more lists of used memory blocks can be taken. As elements of the quantities and/or lists, addresses of the memory blocks are preferably used.

The allocation of memory blocks is preferably done dynamically and/or at periodic intervals. In particular, the allocation module is embodied such that upon the request of a writing client, a memory block from the supply quantity of an occupation quantity is allocated, and/or upon release of a memory block by a writing client, a memory block from the occupation quantity of the released memory block is allocated to the supply quantity. Thus all the operations of requests and releases of memory blocks are defined on the basis of the static memory blocks. This aspect further emphasizes the advantage that fragmentation problems, which occur from writing and erasing operations in systems with logically allocated memory space, are precluded.

In a refinement of the invention, the supply quantity and/or the occupation quantity and/or occupation quantities are embodied as concatenated lists; preferably each element of one quantity or list points to the following and/or preceding element. This embodiment allows especially simple administration of the memory blocks. Preferably, the concatenated lists are embodied as rings, so that FIFO (first in first out) structures can be displayed, for instance for endless recordings by the video camera.

In an especially preferred embodiment, a writing client, and in particular precisely one writing client, is allocated to each occupation quantity. This allocation, after a transfer of data about the occupation quantity, and in particular the address data of the memory blocks, from the allocation device to the writing client, enables the writing client to "know" the memory space allocated to it by the allocation device, or in other words its allocated memory blocks, and it can thereafter store its data streams in memory on its own, and in particular without interpositions of the allocation device.

It is preferably provided that the allocation module allocates memory blocks of physically different storage media to an occupation quantity. This embodiment is based on the concept that a physical storage medium, such as a hard disk, can fail. Because the memory blocks of an occupation quantity are allocated to a plurality of physically different storage media, if one storage medium fails only a limited number of memory blocks, and in particular only one memory block, is affected. In an especially secure embodiment, each memory block is allocated to an occupation quantity on a different storage medium, so that no more than one memory block is allocated to one occupation quantity per storage medium. In supplementary fashion, known mechanisms for data security may be implemented, such as RAID technology.

Optionally, the video recording system also includes one or more memory servers, which are embodied for instance as so-called iSCSI servers. Alternatively, the memories are embodied on the basis of NFS or some other type of NAS (Network Attached Storage). In particular, the iSCSI servers can be embodied as RAID drives or as VIP-X video servers, sold by the present Applicant, with local hard drives. Preferably, the memory network and/or the memory servers are embodied for block-based access for reading and writing data.

It is preferred that a plurality of memory blocks or each memory block of one of the occupation quantities or each of the occupation quantities includes a data region, also called a header, in which as data, a reference on a writing client allocated to the occupation quantity and/or information about the data stored in the memory block and/or information about the preceding and/or following memory block in the list of the occupation quantity is included. The reference to the allocated writing client is for instance embodied as a MAC (Media Access Control) address—also known as a LAN address, ethernet ID, or for Apple, Airport ID—and is the hardware address of a network device that serves the purpose of uniquely identifying the device in the network.

For instance, the header thus references a specific surveillance camera or the like. Moreover, the header includes information about the data stored in a memory block, in particular information about a recording time period with a surveillance camera or the like. In one possible embodiment of the invention, the header also includes information about the preceding and/or following memory block in the list of the occupation quantity. The header preferably has a very small data volume and in particular takes up less than 1% of the memory block in each case.

By using the header data, it is possible for the recording system to remain operationally ready even if the allocation device fails:

First, it is possible for a substitute allocation device to collect the header data of all the memory blocks and thereby gain an overview about the allocation of memory blocks. After this analysis phase, the substitute allocation device is in a position to take on the function of the allocation device that failed.

Second, solely from the header data, the writing clients are in a position to recognize the particular memory block that follows and to store data, data streams, or video data in memory on their own, and in particular without access to the allocation device.

The video recording system is optionally characterized by at least one reading client, which is embodied for reading out the video data stored in memory with the recording system. Preferably, the reading client includes a video data decoder. The reading client is embodied by software and/or hardware in such a way that it requests data, in particular address data, about an occupation quantity from the allocation device and evaluates it and/or, by requesting and evaluation of the headers of the memory blocks, puts the data, in particular the address data, about an occupation quantity together.

Once the data about the occupation quantity, which is preferably in the form of a block address list, is received or set up, the reading client is embodied such that it can read out the video data of an occupation quantity from the memory server or memory servers on its own, in particular without interposition of the allocation device. Once again, this shows the advantage of the proposed architecture, since reading out the video data once the (address) data of an occupation quantity are known can be done by the reading client entirely without the interposition of the allocation device.

The at least one writing client is furthermore embodied for requesting data about an occupation quantity allocated to the at least one writing client. The writing client is preferably embodied as a video data encoder and/or is hard-wired to it. Preferably, the writing client is embodied such that after receiving the data about the occupation quantity, it can store data in the memory blocks of the associated occupation quantities on its own, that is, independently of the allocation device. The video data, which in particular is encoded, by sequentially writing data into a memory block of the occupation quantity until such time as this memory block is full. Once the memory block has been fully written, the writing client changes to the next block of the occupation quantity, in particular of the block address list.

The writing client is furthermore optionally embodied for requesting and/or releasing memory blocks for adding to or reducing the allocated occupation quantity. Addition is necessary for instance if the recording time of a video camera exceeds a defined limit, so that the storage volume allocated until then is no longer adequate. A release of memory blocks can be initiated by an erasure operation originating at the writing client.

In a preferred refinement of the recording system, the writing client is embodied such that in the event of a writing error in a current memory block of the allocated occupation quantity, the writing client, on its own and/or independently, changes to a different memory block of the associated occupation quantity. If no further memory block is available, then a writing error leads to a request to the allocation device for a further memory block. Such a change of memory block or a new request for a further memory block is also initiated if the writing client is unable to access a memory block, for instance because of a communication error. Since each memory block is an independent unit, a writing error, for instance if there is a power failure, can at most lead to a loss of the current memory block but not to the loss of the entire writing client recording.

If additional storage volume is added during the running time of the memory network, this additional storage volume is subdivided into additional static memory blocks and allocated to the supply quantity of memory blocks.

If the storage volume fails during the running time of the memory network, the affected memory blocks of the storage volume are deleted from the supply quantity and/or the occupation quantities.

One important aspect of the invention is thus that all the mass stores for recording data in a memory network, or in other words the total capacities of the memory servers in the network, are made virtual. The division of the storage volume into memory blocks of fixed size leads to a defined fragmentation of the storage volume, and this defined fragmentation no longer changes during the running time of the memory network, since all the operations for requesting and releasing memories are defined in terms of these fixed memory blocks.

In the proposed system for recording video data, the data from a respective video source is independently stored in the memory blocks by the video server associated with the video source, and this server acts as a writing client in the memory network. The complete recordings of the data from a data source of a video server are available, after storage in memory, for instance in the form of a concatenated list of occupied memory blocks. Old memory blocks and memory blocks no longer needed from the list of occupied memory blocks, or in other words from the occupation quantity, can be released and are reassigned to the list of free blocks, in other words to the supply quantity.

Memory blocks with data that are to be stored permanently are removed from the memory network and are no longer available. Playback of the stored data is also possible by direct access to the memory servers, without the presence of the writing client and in particular of the video servers. For this purpose, the reading clients require only knowledge of the list, in particular the concatenated list, such as the block address list, and can then create an overview of the status of recording in the memory network on their own, in particular without the allocation device and/or writing clients. Simultaneous access to one memory server by a plurality of writing clients and/or reading clients is then possible.

Compared to conventional memory networks, the proposed architecture makes only a slight reserve capacity necessary to design the memory network in a failsafe way with regard to memory errors. Since most writing clients and/or memory servers contain a plurality of physically independent memory units as standard, the need for the memory blocks of an occupation quantity to be distributed to physically independent memory units can usually be met without additional expense and thus economically.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Identical elements in the drawings are all identified by the same reference numerals.

Figure 1:
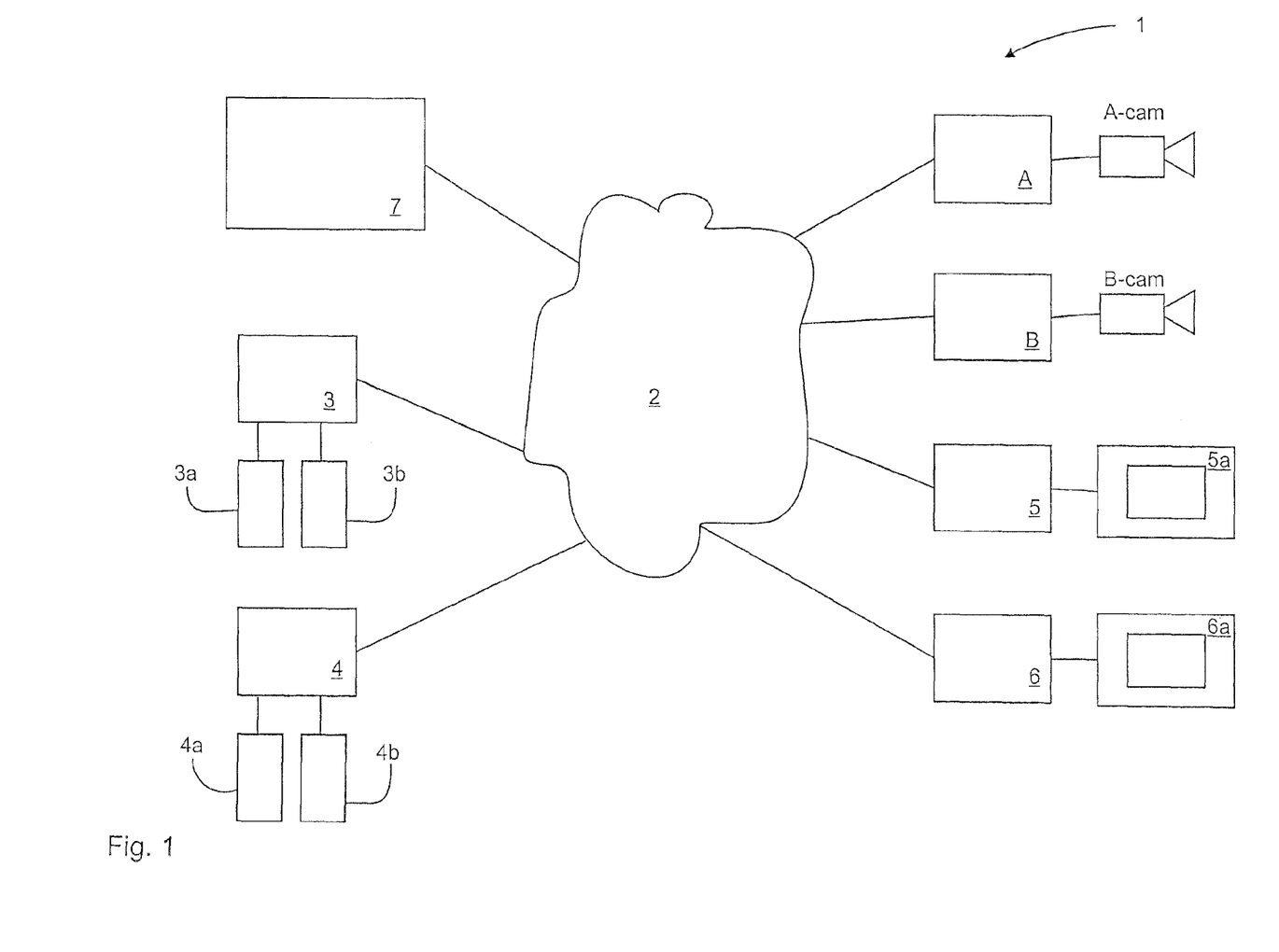
FIG. 1 shows a first exemplary embodiment of a recording system for recording video data, in a schematic block diagram.

FIG. 1 in a schematic block diagram shows a video recording system 1, which includes a network or memory network 2, to which memory servers 3 and 4, writing clients A and B, reading clients 5 and 6, and an allocation device 7 are connected or networked. The network 2 transmits data by the TCP/IP protocol and can be embodied physically as a landline and/or wireless network, and in particular as part of the Internet.

The memory servers 3 and 4, like the writing clients and reading clients A, B, 5, 6, stand for an arbitrary number of such components in the video recording system. The memory servers, or all the components, are embodied for instance as iSCSI servers, but in principle the memory servers 3 and 4 may be embodied arbitrarily. Each memory server includes two storage media 3a, b and 4a, b, respectively, which are each embodied as separate and thus physically independent component units or groups. This number, too, is merely an example.

The storage media 3a, b and 4a, b serve to store data in the form of compressed video data, audio data, or other data and information that are furnished by the writing clients A, B. The memory servers 3 and 4 are each networked to the network 2 via an interface in the form of a network node.

The writing clients A and B are each connected to a respective video camera, A-cam and B-cam. The cameras A-cam and B-cam are embodied as surveillance cameras, for instance black-and-white cameras, color cameras, UV cameras, or infrared cameras, or the like. The cameras A-cam and B-cam furnish streams of video data to the writing clients A and B, respectively. Encoder devices are provided in the writing clients A and B and encode the streams of video data, for instance by the MPEG method. The writing clients A and B may for instance be embodied as VIP-X video servers, of the kind sold by the present Applicant. The writing clients A and B are networked to the network 2 via interfaces in the form of network nodes.

The reading clients 5 and 6 each have a decoder, and the decoders are embodied for decoding encoded and/or compressed data, in particular streams of video data. The reading clients 5 and 6 are each connected to a respective monitor 5a and 6a, on which the picture contents of the decoded streams of video data can be displayed. Alternatively or in addition, the reading clients 5 or 6 are equipped with further output units for displaying transmitted information. The reading clients 5 and 6 are networked to the network 2 via interfaces that are embodied as network nodes.

The allocation device 7 performs the task of administering the available storage volume of the memory servers 3 and 4 and making it available to the writing clients A and B and reading clients 5 and 6. The allocation device 7 is embodied as a central or centralized component, of which there is only one in the video recording system 1.

Figure 2:
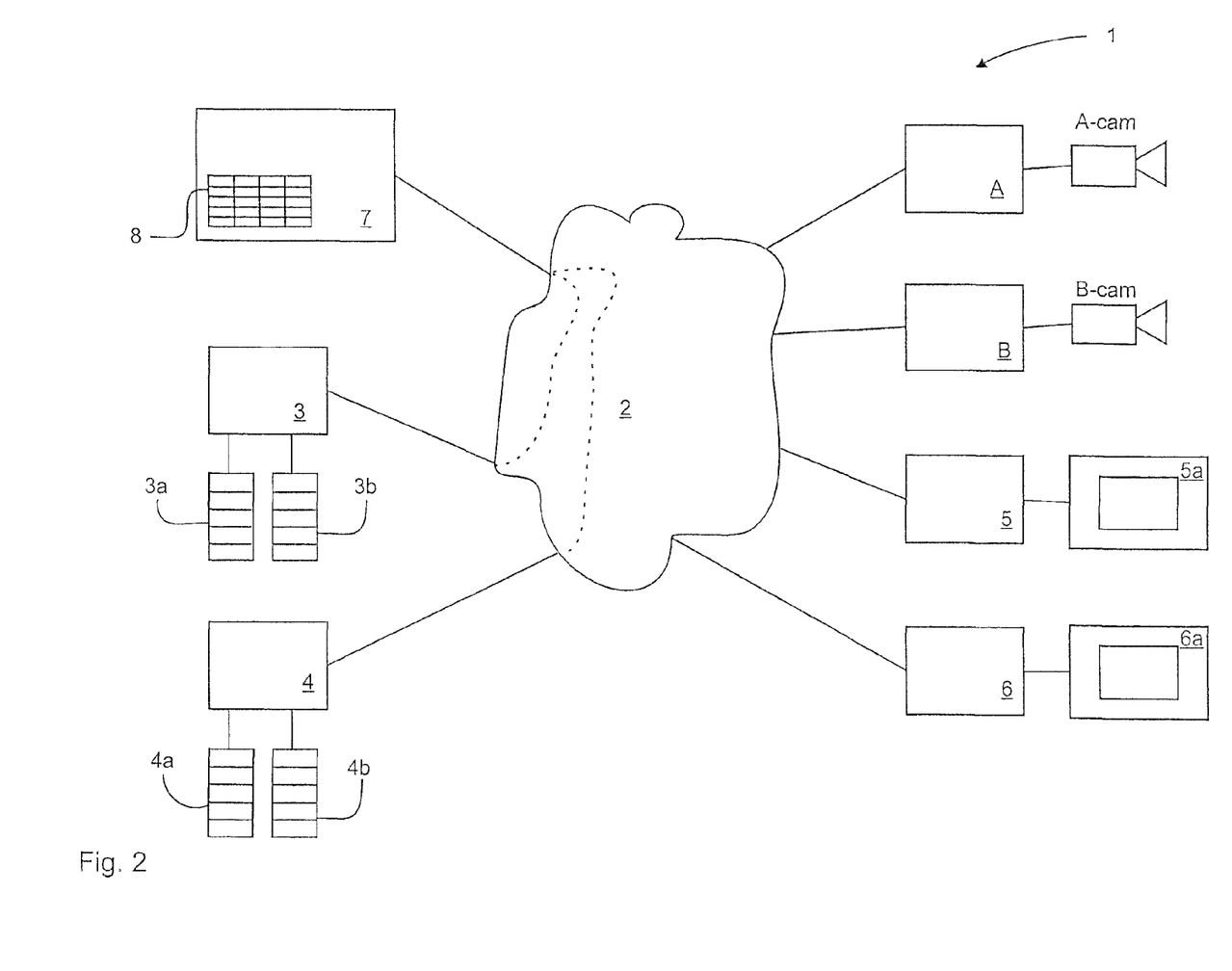
FIG. 2 shows the video recording system of FIG. 1 during initialization.

FIG. 2 shows the video recording system 1 in the same view as in FIG. 1, during initialization.

During this initialization phase, the allocation device 7, via the network 2, performs a division of the storage media 3a, b, 4a, b into fixed memory blocks. The division of the storage media 3a, b, 4a, b is done into physical regions that each have a size of 1 gigabyte, for instance. In an especially preferred embodiment, the memory blocks are all the same size.

Optionally, it is provided that even during the initialization, the allocation device 7 inserts a header into each memory block, and the header includes information about the next memory block and/or a preceding memory block.

In the allocation device 7, a supply quantity 8 of free/unused memory blocks in the storage media 3a, b, 4a, b is formed, in the form of a memory block address list, and each element in the memory block address refers uniquely to one physical region in the storage media 3a, b, 4a, b.

Figure 3:
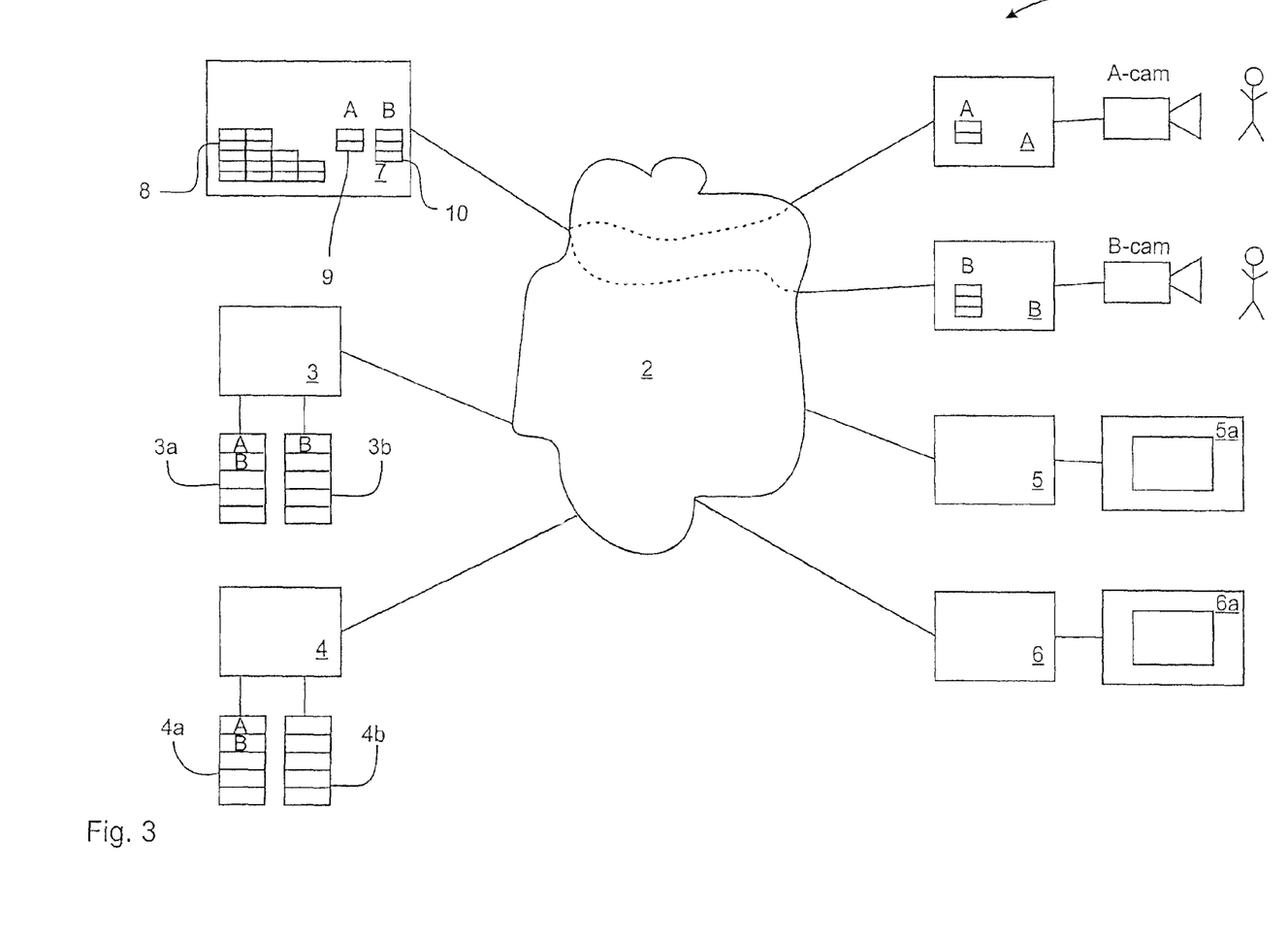
FIG. 3 shows the video recording system of FIG. 1 during a phase of allocating memory blocks to the writing clients.

FIG. 3 shows the video recording system 1 of FIG. 1 in the same view as in that drawing, during the allocation of memory blocks to the writing clients A and B.

Upon the activation of the writing clients A and B, these clients send a request for memory space to the allocation device 7. The allocation device 7 generates an occupation quantity 9 for the writing client A and an occupation quantity 10 for a writing client B by allocating memory blocks of the supply quantity 8 to the respective occupation quantities 9 and 10. The occupation quantities 9 and 10 also include, as their elements, only the memory block addresses.

These occupation quantities 9 and 10 are then forwarded to the writing clients A and B, respectively, via the network 2. In an especially secure embodiment of the video recording system 1, the generation of the occupation quantities 9 and 10 is effected such that the memory blocks of the individual occupation quantities each originate in different storage media 3a, b, 4a, b. For instance, one memory block of the occupation quantity 9 originates in the storage medium 3a, and the other originates in the storage medium 4a.

Figure 4:
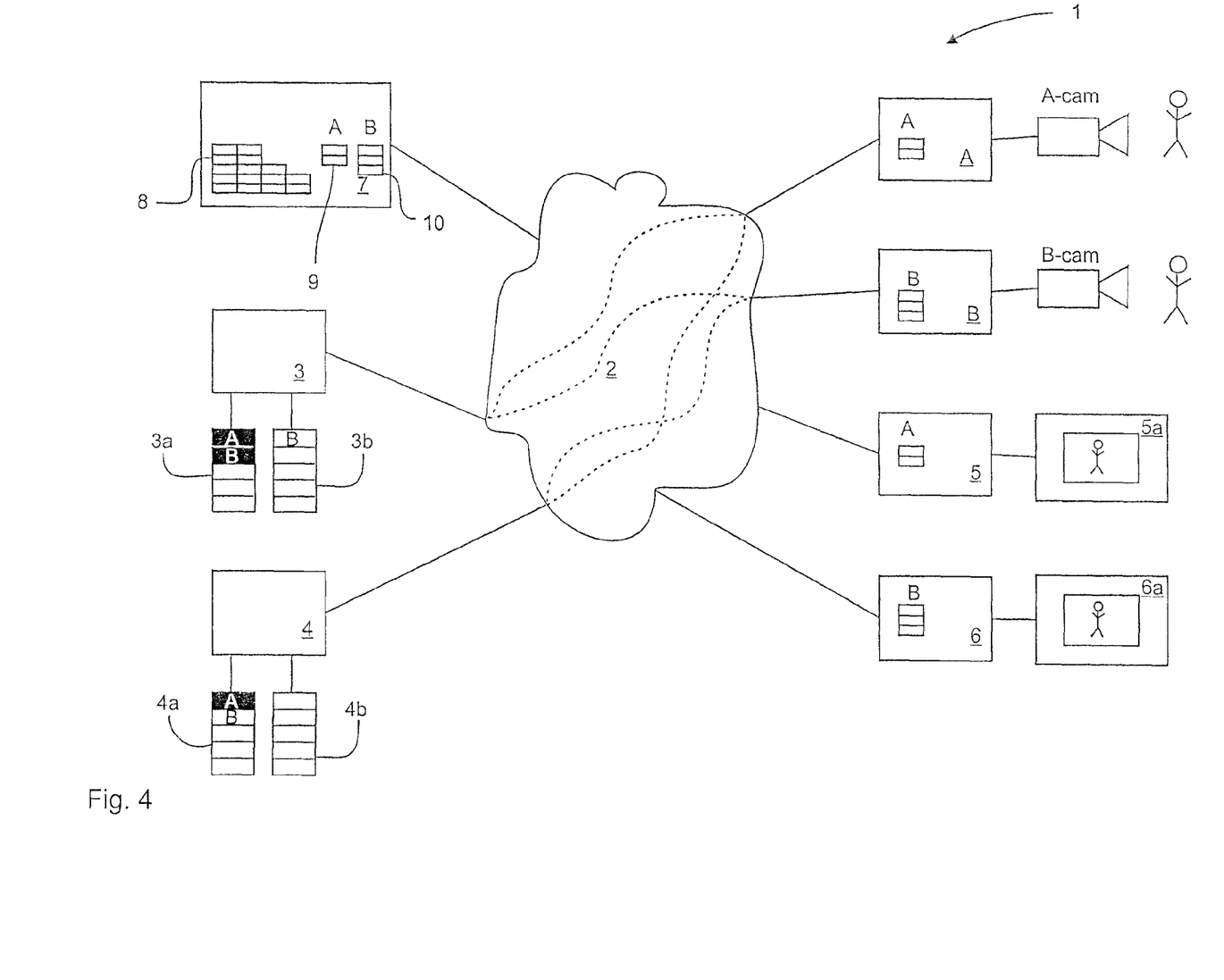
FIG. 4 shows the video recording system of FIG. 1 during a writing phase.

FIG. 4 shows the video recording system 1 of FIG. 1 during a writing phase. During the writing phase, the writing clients A and B generate encoded streams of video data, which are forwarded via the network 2 to the allocated memory blocks in the storage media 3a, b, 4a, b. As can be seen from the drawing, during the writing operation the encoded streams of video data are transmitted without interposition of the allocation device 7. Thus the writing clients A, B are capable, on their own and/or independently, of writing the encoded streams of video data onto the storage media 3a, b, 4a, b. The writing clients A and B begin writing onto the first memory block allocated to them.

As soon as this first memory block is full, the next memory block is selected from the occupation quantity 9 and 10 of the writing clients A and B, respectively, and the writing operation onto the selected memory block continues. In addition to the encoded streams of video data or other information, such as audio data, header information is stored in the memory blocks; it includes a unique association of the writing client A or B and time information, such as the recording time of the encoded streams of video data transmitted. The unique association can be achieved for instance by means of a MAC (Media Access Control) address of the cameras A-cam and B-cam, respectively.

For reading out the stored data of a writing client A and B, respectively, the respective reading clients 5 and 6 request the occupation quantities 9 and 10, respectively, from the allocation device 7. After the occupation quantities 9 and 10 have been forwarded, the reading clients 5 and 6 are capable on their own, and in particular without further interposition of the allocation device 7, of accessing the respective memory server 3 and 4 and reading out the memory blocks, referenced via memory block addresses, in the occupation quantities 9 and 10. Once again, it must be stressed that the readout after the transmission of the respective occupation quantity 9 or 10 is done via a network connection, without interposition of the allocation device.

Figure 5:
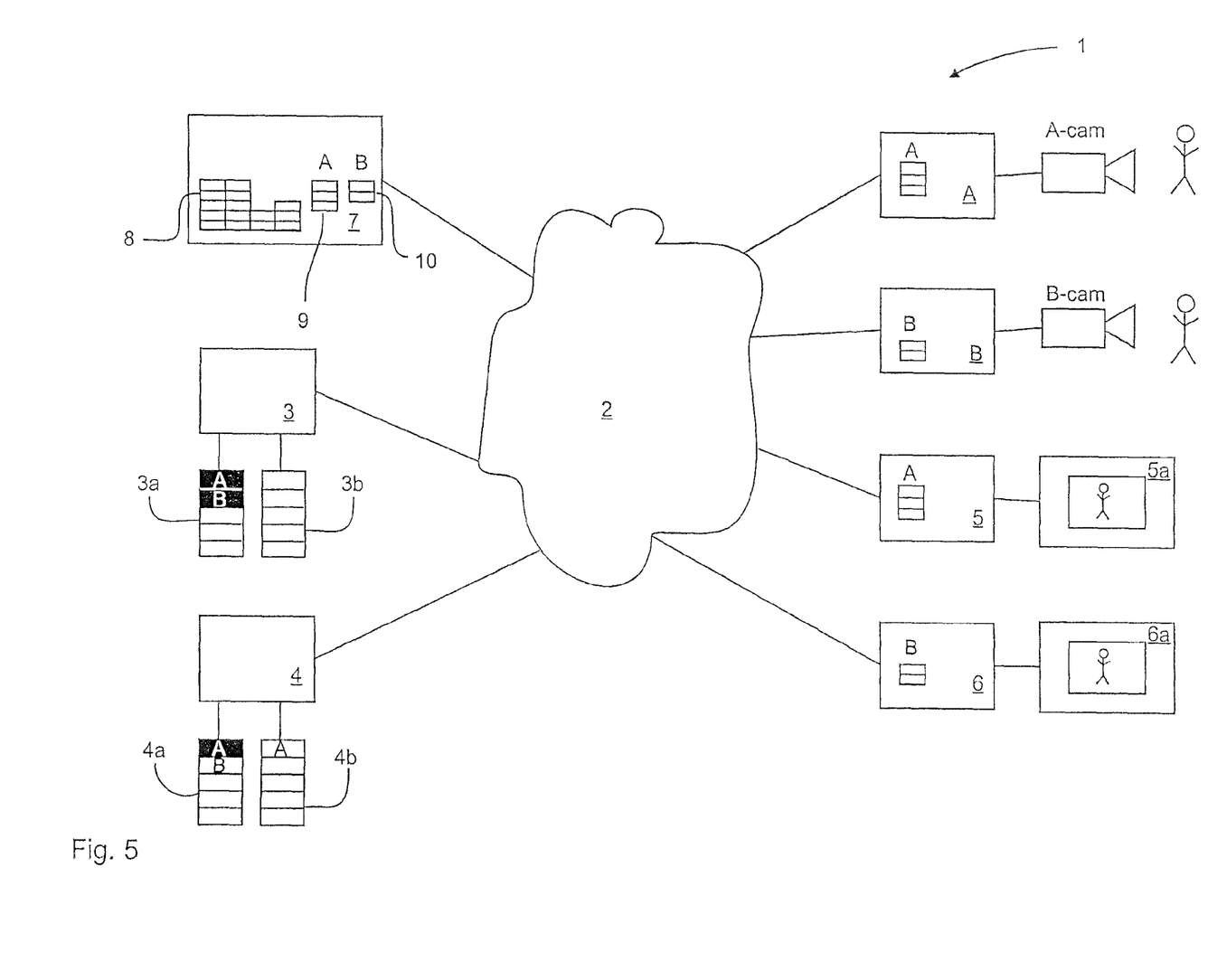
FIG. 5 shows the video recording system of FIG. 1 after a release or re-request of memory blocks on the part of the writing clients.

FIG. 5 illustrates the behavior of the video recording system 1 of FIG. 1 upon a release of or request for memory blocks by the writing client A and B. As could already be seen from FIG. 4, the writing client A has already written into its two memory blocks allocated to it completely, as represented by the black shading of the memory blocks marked A. So that it can continue to store streams of video data or encoded streams of video data in memory, the writing client A sends a request to the allocation device 7, which as its reaction to this adds a free memory block from the supply quantity 8 to the occupation quantity 9 and forwards the augmented occupation quantity 9 to the writing client A. The writing client A is now in a position to write further streams of video data into the newly added memory block.

By comparison, the writing client B is releasing a memory block, once it has been found during the writing operation in FIG. 4 that the number of memory blocks allocated in the occupation quantity 10 is too large. In that case, the writing client B sends a release to the allocation device 7, which thereupon transfers one memory block from the occupation quantity 10 to the supply quantity 8. Such a release also takes place for instance if a data erasure in one or more memory blocks is initiated by the writing client B. Regardless of the reorganization of the occupation quantities and supply quantities, the compressed streams of video data continue to be transmitted by the writing clients A, B on their own to the memory servers 3 and 4, respectively.

As can be seen in FIG. 5, reading clients 5 and 6 are also informed of the change in the occupation quantity 9 and 10, respectively. This information can either be output actively to the reading clients 5 or 6 by the allocation device 7, or the reading clients 5 or 6 can ask at regular and/or periodic intervals or in an event-controlled fashion for updating of the occupation quantities 9 and 10, respectively. It should be noted that the request for and release of memory blocks is always done on the basis of the static memory blocks defined during the initialization, so that uncontrolled fragmentation of the storage media 3a, b, 4a, b cannot occur.

If new storage media and/or memory servers are connected to the video recording system 1, thus increasing the storage volume, then the storage volume gained is likewise divided by the allocation device into memory blocks, and the addresses of the memory blocks are administered in the supply quantity 8. If a memory server and/or a storage medium is excluded—intentionally or unintentionally—from the video recording system 1, then the allocation device 7 deletes the respective addresses from the supply quantity or the occupation quantity and—if needed—replaces them with free, available memory blocks.

Figure 6:
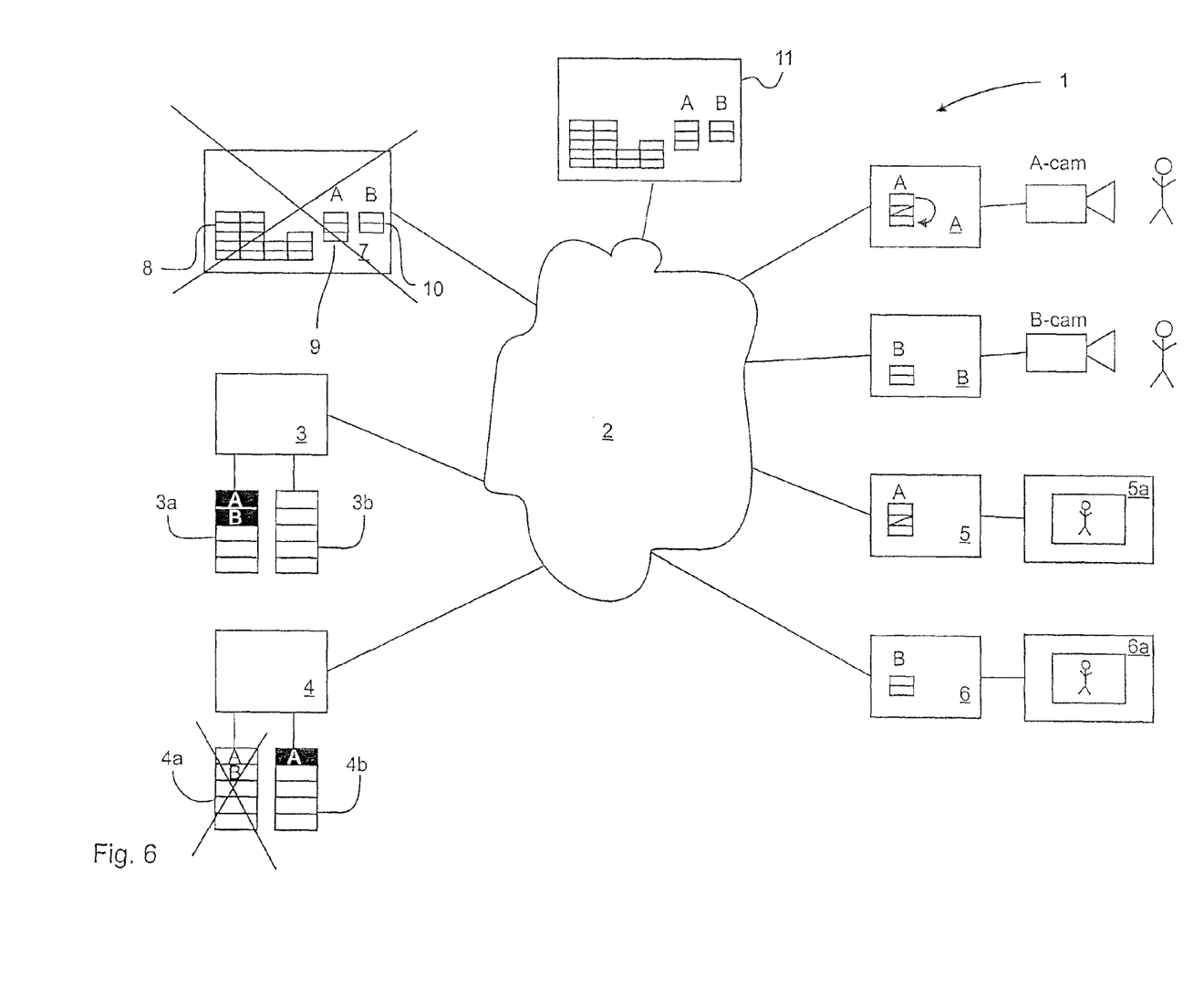
FIG. 6 shows the video recording system of FIG. 1 in the event of failure of a storage medium or of the allocation device.

FIG. 6 illustrates two mechanisms for enhancing the fail-safety of the video recording system 1, again in terms of the video recording system 1 of FIG. 1.

If a storage medium, in the present case assuming the storage medium 4a, fails, it is provided that the writing client A, which attempts to access the failed storage medium 4a, notes this failure. It does not matter whether the failure was directly due to a network error on the part of the network 2 or a server error of the memory server 4 or a storage medium error. If the writing client A finds that it cannot access a memory block in its occupation quantity 9, then it skips this memory block and writes the information to be stored, in particular the video data, onto the memory block following it. In addition, the writing client A sends a message to the allocation device 7, which removes the failed memory block and/or the failed storage medium 4a, as applicable, from the supply quantity 8 or the occupation quantities 9 and 10. Since each memory block represents an independent unit, and preferably the memory blocks of one occupation quantity 9 or 10 are distributed to different storage media 3a, b, 4a, b, a writing error, for instance in the event of a power failure, leads at most to the loss of the current memory block but not to the loss of all the recordings of the writing client.

As a second mechanism, it is provided that in each written memory block, a header is inserted in which a unique reference to the writing client A, B and information about the recording time are stored. By means of this header, the video recording system 1 is redundant, for protection in the event of a failure of the allocation device 7.

As already noted above, each writing client A, B and/or reading client 5 or 6 has a list available of the memory blocks to be used or read out from. A brief failure of the allocation device 7 accordingly does not lead to problems until new memory blocks are requested or occupied memory blocks have to be released.

In the event that the allocation device 7 fails permanently, then it is possible for a substitute allocation device 11 to be formed, by reading out the header information from all the memory blocks. Since all the relevant information on the association of the memory blocks with the respective occupation quantities 9 or 10 and the supply quantity 8 are stored in the headers, it is possible to reconstitute these quantities once the header information has been acquired. Once the allocations have been reconstructed, the substitute allocation device 11 completely takes over for the failed allocation device 7. Preferably, the substitute allocation device 11 and the allocation device 7 are identically and/or analogously constructed.

Alternatively or in addition, it is possible for each individual writing client A, B or reading client 5 or 6 to collect the header information and in this way to construct the particular occupation quantity 9 or 10 required on its own and/or independently.

Optionally, it is provided that the allocation device 7 performs a dynamic adaptation of the memory block distribution and thus of the address lists to the writing clients A and B, in order to adapt the distributed memory capacity, for instance to alarm-controlled recordings and recording methods that employ dynamic bit rates.

In summary, the video recording system 1 thus makes all the storage media 3a, b, 4a, b virtual and distributes them to the writing clients A, B as a function of the memory capacity and/or in an event-oriented fashion. The data from the writing clients A, B are each stored independently in the memory servers 3 and 4, respectively. Playback of the recorded data is possible by direct access by the reading clients to the memory servers, without the presence of the writing clients A, B or of the allocation device 7 or 11. For the sake of knowing the structure of the occupation quantity 9 or 10, each writing client and/or reading client A, B, 5, 6 can create an overview about the status of the recording in the entire system at any time. This is supported, among other ways, by simultaneous access to one server by a plurality of clients.

It will be understood that each of the elements described above, or two or more together, may also find a useful application in other types of methods and constructions differing from the type described above.

While the invention has been illustrated and described as embodied in a video recording system, method and computer program for memory space distribution in a video recording system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A video recording system for recording video data in a memory network including interfaces for connecting memory servers to storage volumes and for connecting writing clients, the video recording system comprising
   at least one writing client for furnishing the video data;
   an allocation device for the memory network, said allocation device configured for administering a storage volume of the memory servers, in that said allocation device, in an allocation stage, dynamically allocates statically divided memory blocks of physically different storage media of the storage volume to said at least one writing client and transfers address data of the allocated memory blocks to said at least one writing client; and
   at least one surveillance camera which is configured for generating the video data and is hard-wired to said at least one writing client,
   wherein after the allocation stage, said at least one writing client writes, on its own, using the address data previously transferred to write the video data directly to at least one of the allocated memory blocks of the storage volume without further interposition of the allocation device.

2. A video recording system as defined in claim 1, wherein said statically divided memory blocks are configured as reserved physical regions of said storage volume.

3. A video recording system as defined in claim 2, wherein the static division of the storage volume is configured as permanent formatting.

4. A video recording system as defined in claim 1, wherein the memory blocks have a parameter selected from the group consisting of a memory size of at least 10 megabytes, a memory size less than 10 gigabytes, and both.

5. A video recording system as defined in claim 4, wherein said memory blocks have the memory size of more than 100 megabytes.

6. A video recording system as defined in claim 4, wherein the memory blocks have a memory size more than 1 gigabyte.

7. A video recording system as defined in claim 4, wherein the memory blocks have the memory size of less than 5 gigabytes.

8. A video recording system as defined in claim 1, wherein all the memory blocks have a same memory size.

9. A video recording system as defined in claim 1; and further comprising an allocation module which is configured as an element selected from the group consisting of software, hardware and both for allocating the memory blocks to an element selected from the group consisting of a supply quantity for free memory blocks, and one or more occupation quantities for used memory blocks.

10. A video recording system as defined in claim 9, wherein the allocation of the memory block is effected in a manner selected from the group consisting of dynamically, at periodic intervals, and both.

11. A video recording system as defined in claim 9, wherein quantities selected from the group consisting of the supply quantity, the occupation quantity, the occupation quantities, and combinations thereof are configured as concatenated lists.

12. A video recording system as defined in claim 9, wherein each occupation quantity is allocated precisely one writing client.

13. A video recording system as defined in claim 9, wherein an element selected from the group consisting of a plurality of memory blocks, each memory block, and one of the occupation quantities includes a data region, in which, as data, a reference to an element selected from the group consisting of an allocated writing client, information about the data stored in the memory block, information about a preceding memory block, information about following memory block, and a combination thereof, is included in the list of the occupation quantity.

14. A video recording system as defined in claim 9; and further comprising at least one reading client configured for a step selected from the group consisting of requesting and evaluating data about an occupation quantity for the allocation device, assembling data via an occupation quantity, and both by requesting and evaluating the data regions of the memory blocks.

15. A video recording system as defined in claim 14, wherein the at least one writing client is configured for a step selected from the group consisting of requesting data about an occupation quantity allocated to the writing client, for requesting further memory blocks for supplementing the allocated occupation quantity, and both.

16. A video recording system as defined in claim 1, wherein the at least one writing client, in the event of a writing error in a current memory block of the associated occupation quality, is configured as an element selected from the group consisting of software, hardware, and both for a step selected from the group consisting of a change of the memory block within the allocated occupation quantity, a request of a further memory block from the allocation device, and both.

17. A method for memory space distribution in a video recording system, comprising the steps of
   providing at least one writing client for furnishing video data;

in an initialization step, administering by an allocation device for the memory network, a storage volume of the memory servers, in that said allocation device dynamically allocates statically divided memory blocks of the storage volume, comprising physically different storage media, to said at least one writing client, the administering including dynamically distributing and transferring client and address data of the dynamically distributed memory blocks to said at least one writing client to enable said at least one writing client to, on its own, directly write to the allocated memory blocks of the storage volume, wherein during the running time of the memory network, added storage value is subdivided into additional static memory blocks, generating the video data by at least one surveillance camera, which is hard-wired to said at least one writing client, and in a writing step, writing the video data by said at least one writing client directly to at least one of the memory blocks dynamically distributed and previously allocated to said at least one client without further interposition of the allocation device.

18. A computer program product comprising a non-transitory computer readable medium having computer readable program code means embodied therein for performing all the steps of the method as defined in claim 17, upon execution of the program code means by a computer.

19. The computer program product of claim 18, wherein each of the elements of the program code means is executed on the video recording system defined by claim 1.

20. A video recording system for recording video data in a memory network including interfaces for connecting memory servers to storage volumes and for connecting writing clients, the video recording system comprising at least one writing client for furnishing the video data;

an allocation device for the memory network, said allocation device configured for administering a storage volume of the memory servers that is statically divided into memory blocks, wherein each memory block is located in a physically different storage media, and wherein in an allocation stage, the allocation device accesses an allocation table identifying lists of free and used memory blocks and allocates memory blocks located respectively in the physically different storage media to the at least one writing client and transfers address data of the allocated memory blocks to the writing client in order to render the writing client to write, on its own, directly to allocated memory blocks; and at least one surveillance camera which is configured for generating the video data and is hard-wired to said at least one writing client, wherein in a writing stage, the at least one writing client uses the address data to write the video data directly to at least one of the allocated memory blocks without relying on the allocation table and without further interposition of the allocation device.

* * * * *